Sept. 22, 1931.  F. H. SWANSON  1,823,996
APPARATUS FOR MAP DISPLAY AND PRESERVATION
Filed Oct. 7, 1927
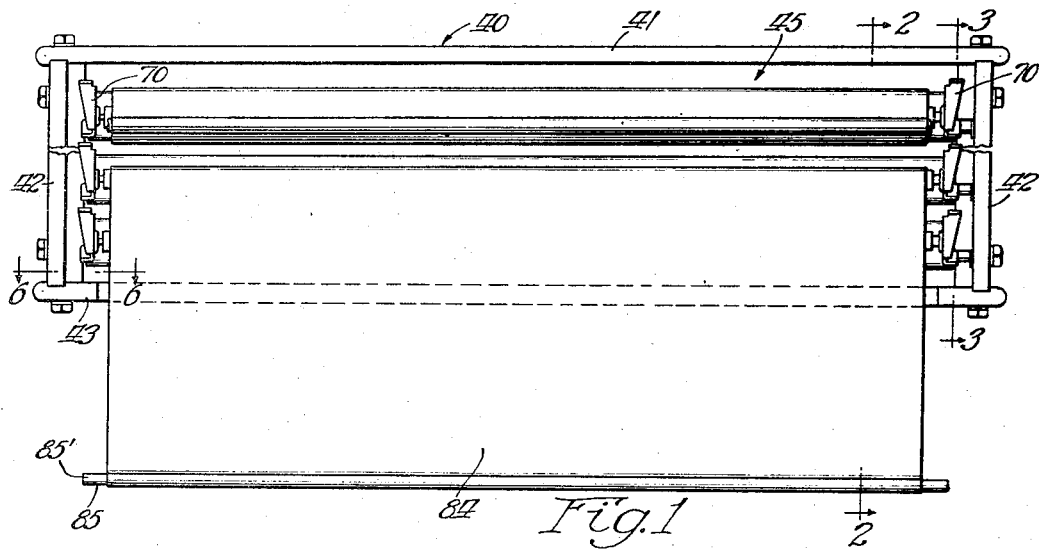
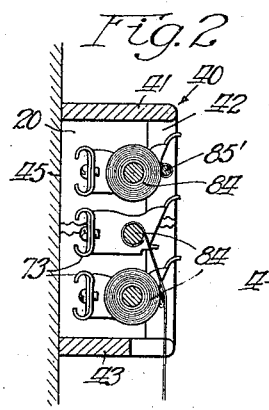
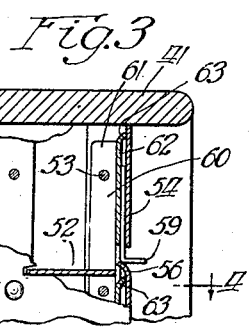
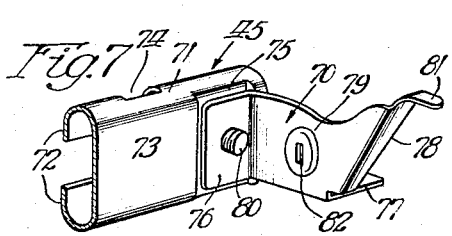
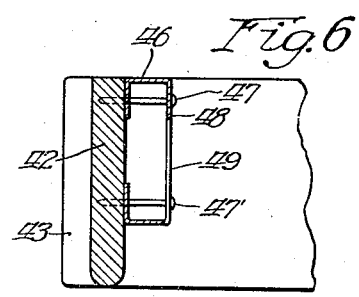
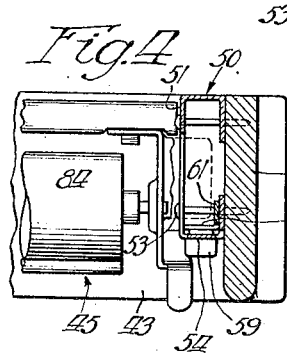
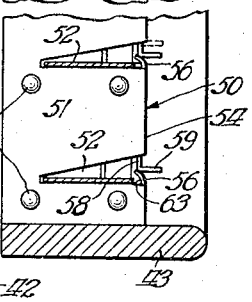
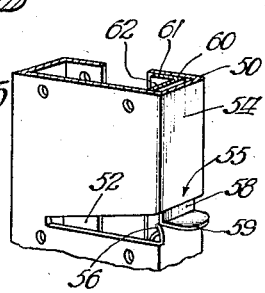

Patented Sept. 22, 1931

1,823,996

UNITED STATES PATENT OFFICE

FRANK H. SWANSON, OF CHICAGO, ILLINOIS, ASSIGNOR TO A. J. NYSTROM & CO., A CORPORATION OF ILLINOIS

APPARATUS FOR MAP DISPLAY AND PRESERVATION

Application filed October 7, 1927. Serial No. 224,651.

The present invention pertains in general to map mountings and more particularly to a map cabinet for the storage, display and preservation of wall maps and charts.

One object of the present invention is to provide an improved cabinet adapted to support and house a plurality of independent map units.

Another object of my invention resides in the provision of latch means for retaining the map units in the cabinet against accidental displacement.

A further object of the invention is the provision of a unitary map mounting including a plurality of spaced brackets each of which includes a flange for co-operation with a gain in the cabinet and a slanting flange or surface for co-operation with an end of the map stick.

A still further object of the invention is to provide a rigid and unitary structure adapted to support a plurality of map units in spaced relationship and in such a manner that they are readily accessible for display purposes. These map units together with others constitute part of a map display system patented by the applicant herein and owned by the assignee hereof, and are also adapted to be used in connection with suspension devices, also part of this system, such as are disclosed in my co-pending application, Ser. No. 224,650, filed October 7, 1927.

The cabinet of my invention is substantial in construction and can be easily moved from place to place.

Other objects and advantages of my invention will more fully appear in the following detailed description taken in connection with the accompanying drawings which illustrates a single embodiment thereof, and in which:—

Figure 1 is a front elevation of the cabinet showing three of my novel map units mounted therein;

Fig. 2 is a sectional view taken on substantially line 2—2 of Fig. 1, looking in the direction indicated by the arrows.

Fig. 3 is an enlarged fragmentary sectional view taken substantially on the line 3—3 of Fig. 1, looking in the direction indicated by the arrows;

Fig. 4 is a fragmentary sectional view taken on substantially the line 4—4 of Fig. 3 looking downwardly;

Fig. 5 is a fragmentary perspective view of one of the side members of the cabinet used to mount the map units;

Fig. 6 is a fragmentary sectional view taken on substantially line 6—6 of Fig. 1 looking downwardly on the drawing; and Fig. 7 is a perspective view of one end of one of the map units.

Like reference characters designate similar parts throughout the several views.

The reference character 40 designates generally a cabinet of my invention which includes a top 41, a pair of sides 42—42, and a base 43. These four parts are rigidly and detachably secured to each other in order to form a rectangular housing for a plurality of map units. It will be noted from Fig. 1 that I have illustrated the cabinet as housing and supporting three map units but it is, of course, to be understood that the cabinet may be designed to hold any desirable number of these units without deviating from the features of the invention. I have designated each of these units of my invention generally by the reference character 45, and, inasmuch as they are identical in construction, it is thought that a description of one will suffice for all.

Secured to the left side 42 of the cabinet 40 is a rectangular metallic mounting member 46 (Fig. 6). This member is secured to the side by means of a plurality of fastening elements or nails 47. The centrally facing side 48 of this member 46 is provided with three spaced slots or gains 49, each of which is adapted to receive a flange of my novel map mounting unit as will become more apparent with the progress of the present description. Rigidly fastened to the right side 42 of the cabinet is a rectangular metallic mounting member 50 (Figs. 3, 4 and 5). This member 50 is hollow in construction and is preferably made of sheet metal. Its centrally facing side 51 is provided with three spaced slots or gains 52, similar in shape to the slots 49 of the member 46. These slots also co-operate with flanges on the units 45 to support these units. The member 50 is preferably secured to the side 42 by means of a plurality of fastening elements such as nails or screws 53.

In Fig. 3, it will be noted that the side 54 of the member 50 is provided with three openings 55 disposed in communication with the slots or gains 52. The lower portion of each of these openings is defined by an inwardly turned ear 56 formed integral with the side 54 of this mounting member. This ear 56 is adapted to abut the lower edge of the latch element which will now be described in detail.

Associated with each slot or gain 52 in the member 50 is an L-shaped drop latch which includes a vertical leg 58 and a lateral extension 59, which extension abuts the top edge of the inwardly turned ear 56 of the drop latch. The lateral extension 59 of each of these drop latches extends through the openings 55 in the side 54 of member 50. The vertical leg 58 of each of these elements is disposed inside of the tubular mounting member 50 between the side 54 and an angular guide strip 60. This angular strip includes a leg 61 disposed parallel to the side 51 of the mounting member and held in place by certain of the fastening elements 53, which extend therethrough. The angular guide element 60 also includes a leg 62 disposed parallel to side 54 of the member 50, and spaced from side 54 so as to define a guideway for the vertical leg of the drop latch within which it will normally move by the action of gravity. The leg 62 of the guide element 60 has formed integral with it a plurality of outwardly turned ears 63 which abut side 54 of the member 50 and serve to space the leg 62 from this side of the member. Each of the drop latches is adapted to be reciprocated in the guideway defined by angular element 60 and the side 54 of mounting member 50. Normally the extensions 59 of these drop latches abut the ears 56 formed integral with member 50. This means that the openings 55 in the side 54 of the member 50 are normally closed by the lower portions of these drop latches.

I shall now proceed to describe in detail the construction of each map mounting unit 45. The unit 45 comprises a pair of spaced brackets 70—70 connected by a metallic mounting member 71. The mounting member 71 is preferably made of sheet metal formed with inwardly turned opposite flanges 72—72 bent back upon the main portion 73 of the member causing it to assume substantially the form of a tube with a partially open side. The upper flange portion is provided with a pair of spaced longitudinal slots 74 which are adapted to co-operate with the hooks of the suspension devices disclosed in my co-pending patent application, Serial Number 224,650, filed October 7, 1927.

That is to say, the unit 45 may be used independently of the cabinet in conjunction with the aforesaid suspension devices. The main portion 73 of the member 71 is provided with flattened portions 75 adjacent to their ends which form seats for flanges 76 formed integral with the associated brackets 70. Each bracket not only includes a flange 76 but includes a flange 77 and a slanting flange 78. The two flanges 76 and 77 (Fig. 7) extend in opposite directions from the main portion 79 of the bracket and each of them is disposed at substantially right angles to the main portion 79. The mounting flange 76 of each bracket 70 is secured to the member 71 by means of a bolt 80, or they may be secured together by electric welding or other means. Now it will be observed that the slanting flange 78 has formed integral with its upper edge an outwardly turned ear 81, the purpose of which will be explained hereinafter.

The brackets 70, when rigidly secured to the mounting member 71, are adapted to receive and support the stub shafts of a map roll in a manner well-known to those familiar with this art. Each of these brackets includes an opening 82 in which a stub shaft of a map may be mounted. In Fig. 2, it will be observed that I have shown three mounting units 45 including three roll maps 84. Each map has a map stick 85, the ends of which 85' are adapted to engage the stop or slanting flanges 78 of the brackets 70 which support it. The function of the outwardly turned ears 81 of the brackets is to prevent the ends of the map stick associated therewith from riding over the tops of the slanting flanges 78 when the map is released from its unwound position.

Each mounting unit 45 and its map 84 is mounted in the cabinet 40 by means of the horizontal flanges 77 on its bracket 70. In mounting the unit in the cabinet, one of its flanges 77 is inserted in one of the slots 49 in the mounting member 46, and the other corresponding flange 77 is brought into proximity with the corresponding slot or gain 52 in the other mounting member of the cabinet. Thereafter the drop latch 59 associated with this gain is raised manually so as to permit of the introduction of the flange in the slot. Once the flange is seated in the gain 52, the inwardly turned ear 56 of the slot will function to prevent accidental displacement of this flange. Also, after the flange has been placed in the gain 52, the latch 59 is released and it gravitates to the position shown in Fig. 5. Obviously in order to remove the flange from the gain, it is necessary to raise it above the ear 56 associated with the gain and to raise the drop latch so as to enable the flange 77 to be withdrawn from the gain. It will, of course, be understood that the other two map units, shown in Fig.

2, are mounted in the cabinet 40 in the same manner as the one described above.

It will be evident from Figs. 1 and 2, that any one of the three maps may be unwound for purposes of display by merely pulling the map stick of the map downwardly. Moreover, should it be desirable to remove any one map unit 45 from the cabinet, the same may be accomplished very readily by simply moving the unit out of co-operation with the associated gains 52 in the mounting members 46 and 50.

Now, I desire it understood that, although I have illustrated and described in detail the preferred form of my invention, the invention is not to be thus limited, but only in so far as defined by the scope and spirit of the appended claims.

I claim:

1. In a map cabinet of the character described, a supporting frame structure including a pair of side members adapted to cooperate with the ends of a map unit, a mounting member for the map unit connected to one of said side members, said mounting member having a slot for receiving a portion of said map unit, and gravity impelled reciprocable drop latch means associated with said slot for retaining the portion of said unit in the mounting member against accidental displacement.

2. In a map cabinet of the character described, a supporting frame structure including a pair of side members adapted to cooperate with the ends of a map unit, a mounting member for the map unit connected to one of said side members, said mounting member having a slot for receiving a portion of said map unit, a vertically movable gravity impelled drop latch associated with said slot for retaining the portion of said unit in the mounting member against accidental displacement, and guide means connected to said mounting member for defining a guideway in which said latch means is movable.

3. In a map cabinet of the character described, a supporting frame structure including a pair of side members adapted to cooperate with the ends of a map unit, a mounting member for the map unit connected to one of said side members, said mounting member having a slot for receiving a portion of said map unit, and a drop latch associated with said slot for retaining the portion of said unit in the mounting member against accidental displacement, said mounting member comprising a sheet metal tube slotted on one side to receive said latch means.

4. In a map cabinet of the character described, a supporting frame structure including a pair of side members adapted to cooperate with the ends of a map unit, a mounting member for the map unit connected to one of said side members, said mounting member having a slot for receiving a portion of said map unit, and a drop latch associated with said slot for retaining the portion of said unit in the mounting member against accidental displacement, said drop latch including an L-shaped element having one leg disposed within said mounting member and having its other leg extending outwardly through an aperture in said mounting member.

5. In a map cabinet of the character described, a supporting frame structure including a pair of side members adapted to cooperate with the ends of a map unit, a mounting member for the map unit connected to one of said side members, said mounting member having a slot for receiving a portion of said map unit, a drop latch associated with said slot for retaining the portion of said unit in the mounting member against accidental displacement, said latch means including an L-shaped element having one of its legs extending through an opening in said mounting member, and guide means associated with the other leg of said latch element.

6. In a map cabinet of the character described, a supporting frame structure including a pair of side members adapted to cooperate with the ends of a map unit, a mounting member for the map unit connected to one of said side members, said mounting member having a slot for receiving a portion of said map unit, and reciprocable latch means associated with said slot for retaining the portion of said unit in the mounting member against accidental displacement, said latch means including a substantially L-shaped latch element having one of its legs extending through an opening in said mounting member, said mounting member having connected to it a laterally extending ear adapted to be engaged by said leg of the latch element to prevent the portion of the map unit in the slot from being displaced.

7. In a map cabinet of the character described, a supporting frame structure including a pair of side members adapted to cooperate with the ends of a map unit, a mounting member for the map unit connected to one of said side members, said mounting member having a slot for receiving a portion of said map unit, and reciprocable latch means associated with said slot for retaining the portion of said unit in the mounting member against accidental displacement, said latch means including a reciprocable element having a lateral extension extending through an opening in said mounting member, said opening being disposed in communication with said slot and being normally closed by said latch element.

8. In a map cabinet of the character described, a supporting frame structure including a pair of side members adapted to cooperate with the ends of a map unit, a mounting member for the map unit connected to one of said side members, said mounting member having a slot for receiving a portion of said map unit, a gravity impelled reciprocable latch means associated with said slot for retaining the portion of said unit in the mounting member against accidental displacement, and a second mounting member carried by another of said side members and having a slot adapted only to receive a portion of the map unit prior to the mounting of the map unit in the slot of the other mounting member.

9. In a device of the character described, a map support comprising a tubular metallic bar including a main portion and inwardly turned opposite flanges, a plurality of brackets having inwardly turned flanges attachable to said main portion of the bar, and outwardly turned flanges cooperable with the walls of the map cabinet, said brackets being further provided with stop flanges adapted to be engaged by the ends of the map stick to limit the winding movement of the map.

10. In combination in a map unit of the class described, a map including a map stick on the free end of the map, and a supporting frame for said map including a plurality of brackets cooperable with the ends of the map, and a spacing bar connecting said brackets and having longitudinally extending upper and lower opposed edge flanges with an aperture in the upper flange adapted to enable said frame to be suspended from supporting clips, such brackets being arranged to engage only the ends of said map stick to limit the rolling of said map.

11. In a device of the character described, a bracket for use in supporting a map or the like, comprising a body portion adapted to receive the stub shafts of a map roller, a spacing bar attaching flange, a map cabinet attaching flange, said flanges being extended from said body portion in opposite directions, and a map stop flange adapted to engage an end of the map stick, said latter flange having an outwardly turned ear adapted to prevent the map stick from riding over the top of the bracket.

12. As an article of manufacture, a bracket adapted for use in supporting roll-type maps or the like, comprising a body portion, a flange portion integral with said portion for enabling said bracket to be secured to a support, said body portion being provided with a slanting surface adapted to engage the end of a map stick or the like, and an outwardly turned ear formed integral with said body portion and associated with said slanting surface adapted to prevent the map stick from riding over the top of the bracket when rolled up under spring impulsion.

13. In a map cabinet of the character described, a supporting frame structure including a pair of side members adapted to cooperate with the ends of a map unit, a mounting member for the map unit connected to one of said side members, said mounting member having a slot for receiving a portion of said map unit, and latch means reciprocable in a straight line for closing said slot to retain the portion of said map unit in the mounting member against accidental displacement.

In witness whereof I have hereunto set my hand at Chicago, Illinois, this 28th day of September, 1927.

FRANK H. SWANSON.